United States Patent [19]
Hattass et al.

[11] Patent Number: 5,507,547
[45] Date of Patent: Apr. 16, 1996

[54] VEHICLE ROOF WITH GLASS LID AND SUNSHIELD

[75] Inventors: Rainer Hattass, Gründau; Dieter Federmann, Hanau, both of Germany

[73] Assignee: Rockwell Golde GmbH, Germany

[21] Appl. No.: 290,278

[22] Filed: Aug. 15, 1994

[30] Foreign Application Priority Data

Aug. 31, 1993 [DE] Germany ............................ 43 29 285.2

[51] Int. Cl.⁶ ........................................... B60J 7/00
[52] U.S. Cl. .......................... 296/211; 296/215; 296/216; 49/38; 359/232; 359/233
[58] Field of Search .................................. 296/211, 214, 296/215, 216; 160/104, 370.21; 49/38; 359/232, 233

[56] References Cited

U.S. PATENT DOCUMENTS

| | | | |
|---|---|---|---|
| 1,492,897 | 5/1924 | Ryder | 29/38 |
| 2,322,733 | 6/1943 | Steiner | 49/38 |
| 2,549,167 | 4/1951 | Brubaker | 49/38 |
| 4,466,658 | 8/1984 | Furst et al. | 296/223 |
| 4,765,676 | 8/1988 | Grimm et al. | 296/216 |
| 5,405,184 | 4/1995 | Jardin et al. | 296/215 |

FOREIGN PATENT DOCUMENTS 218165  1/1910  Germany ................................. 49/38

*Primary Examiner*—Dennis H. Pedder

[57] ABSTRACT

A vehicle roof having a glass lid is framed by a two-part lid frame, a glass pane of which is coated on its lower face with a thin, lattice-like sunshield, preferably applied by the screen printing process. A multilayer closure plate, slidably guided at the lateral longitudinal members of the lid frame, bears from below against the sunshield, the thin closure plate layers of which possess a corresponding lattice-like structure. The closure plate layers are displaceable upon one another and can be displaced or set one after another to provide an infinitely variable cover or exposure of the light apertures of large area of the sunshield. A drive apparatus provides for a corresponding displacement drive of the individual closure plate layers.

3 Claims, 5 Drawing Sheets

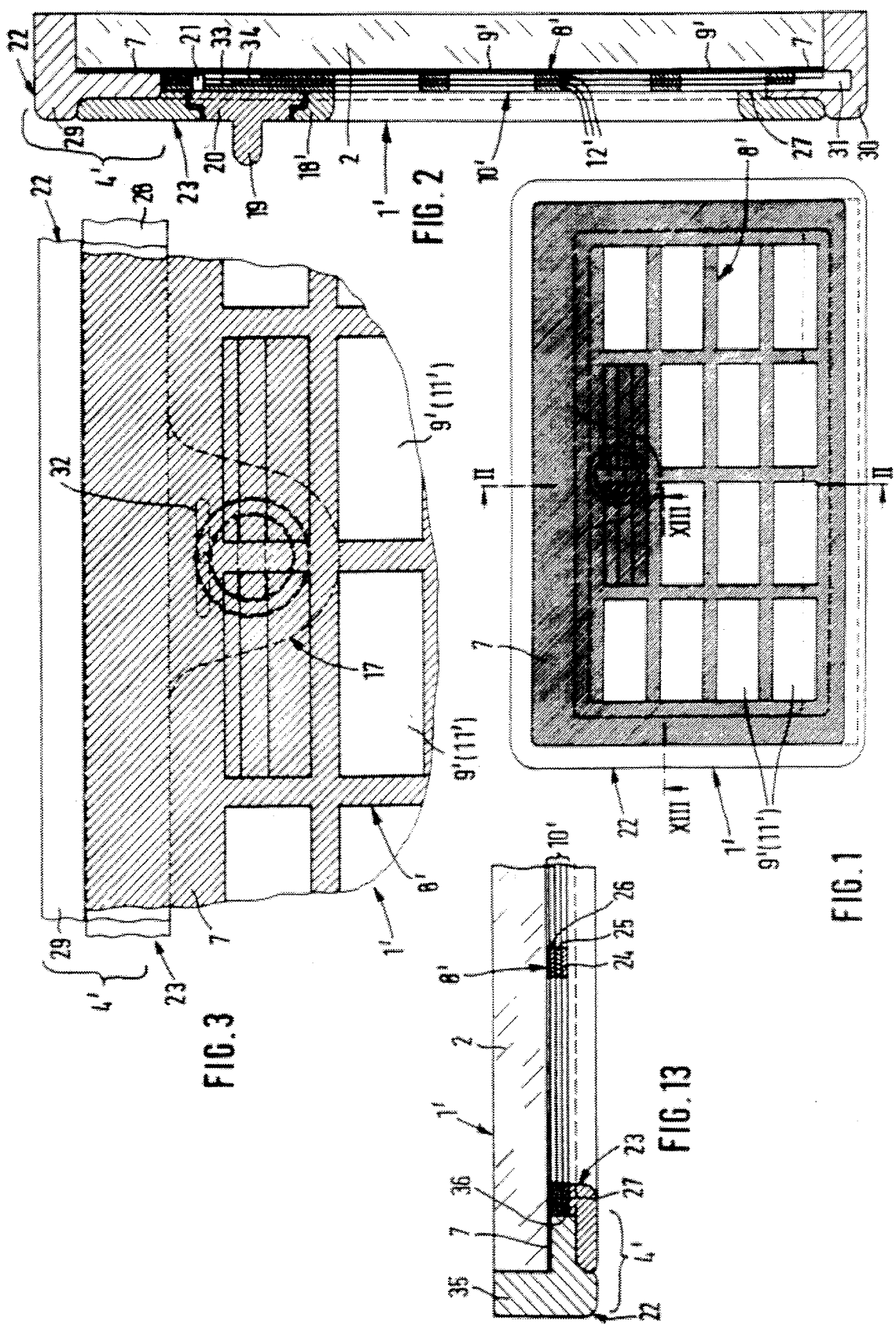

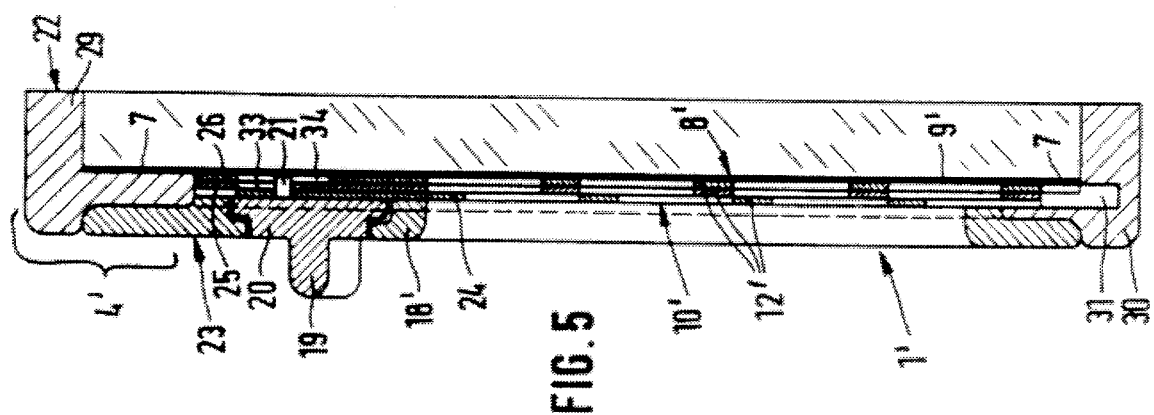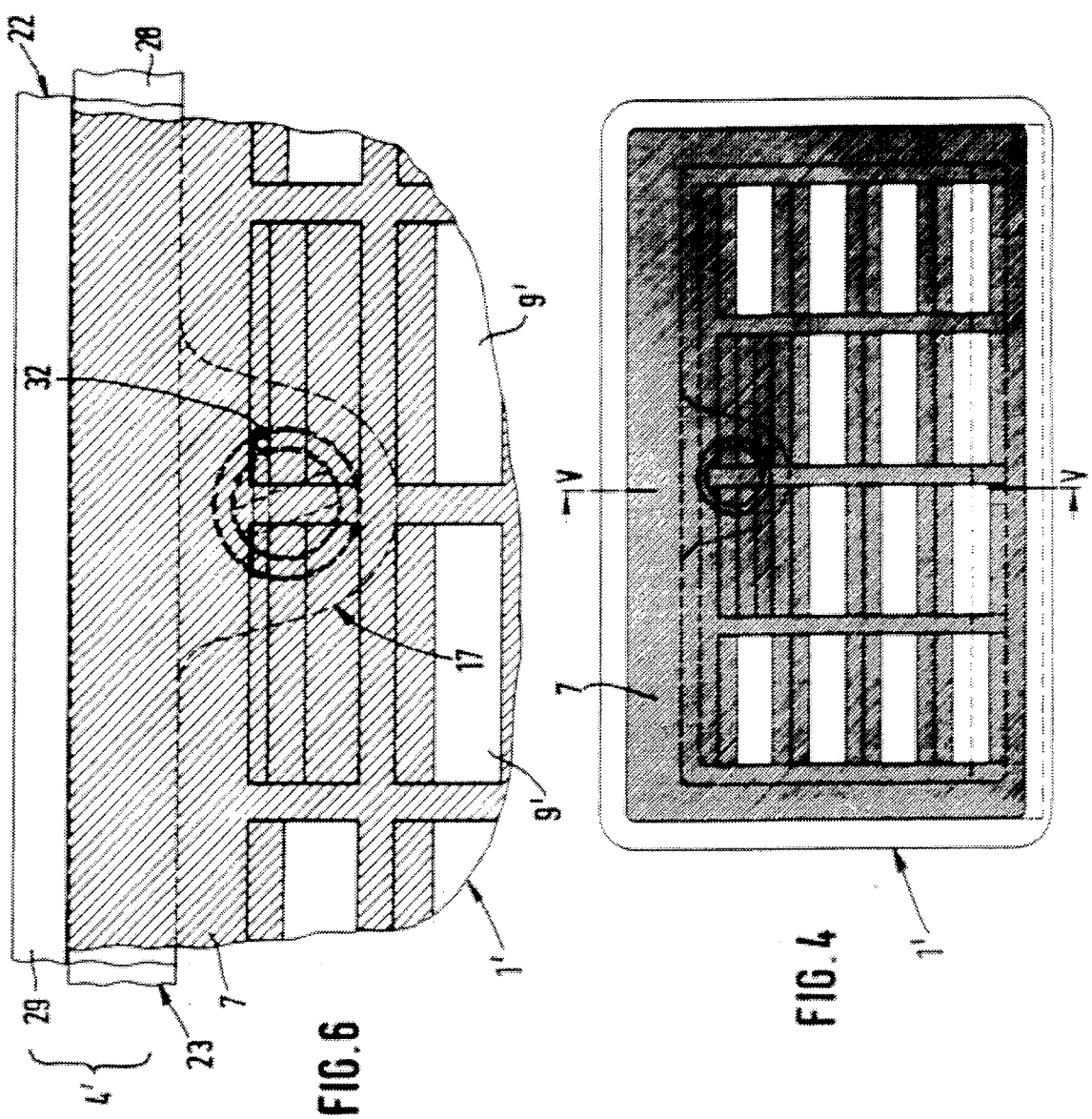

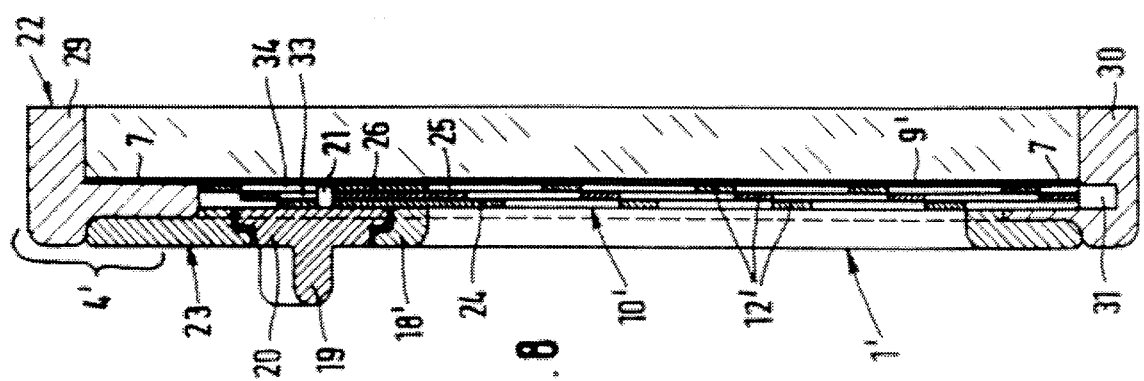
FIG. 8
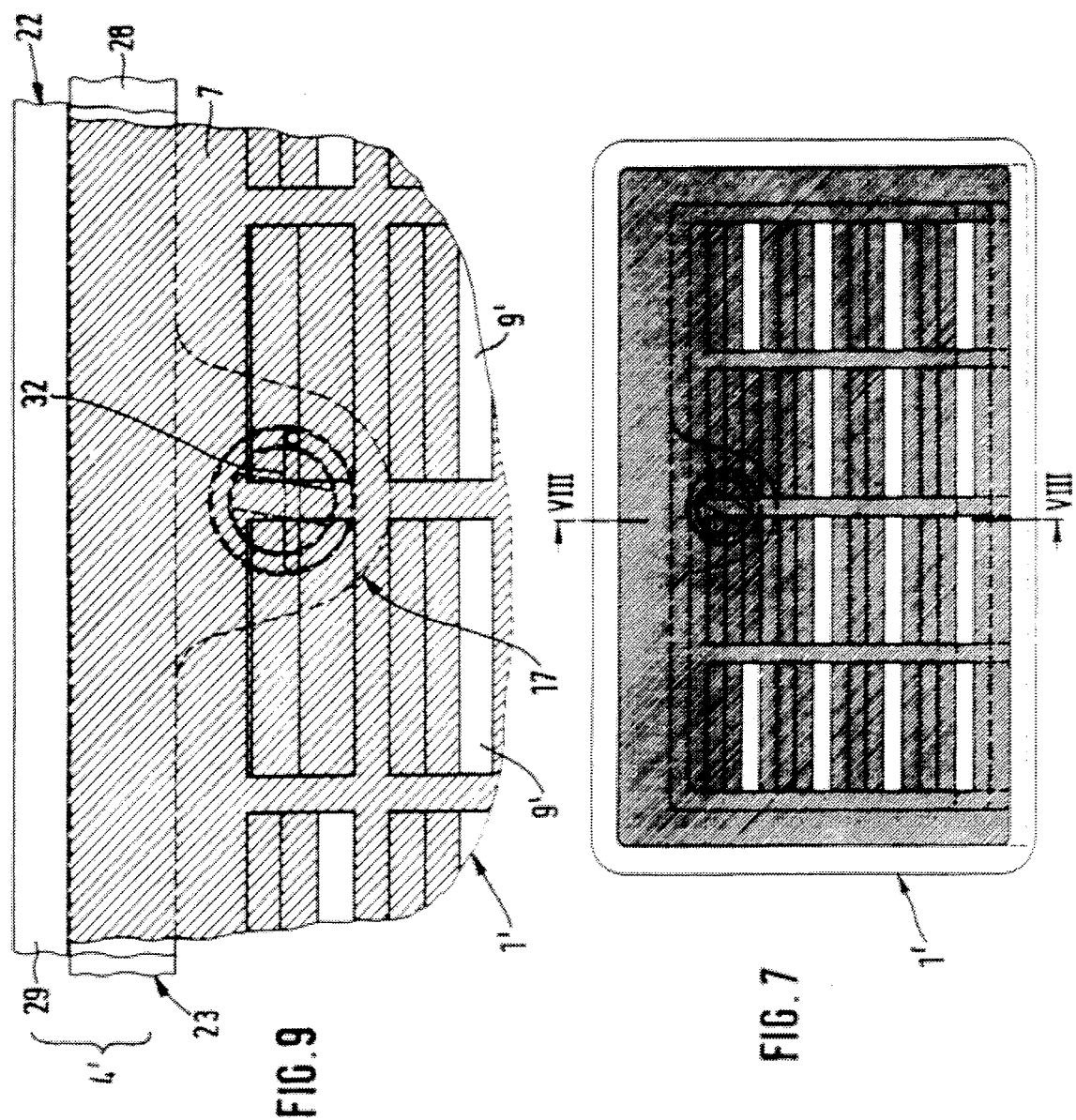
FIG. 9
FIG. 7

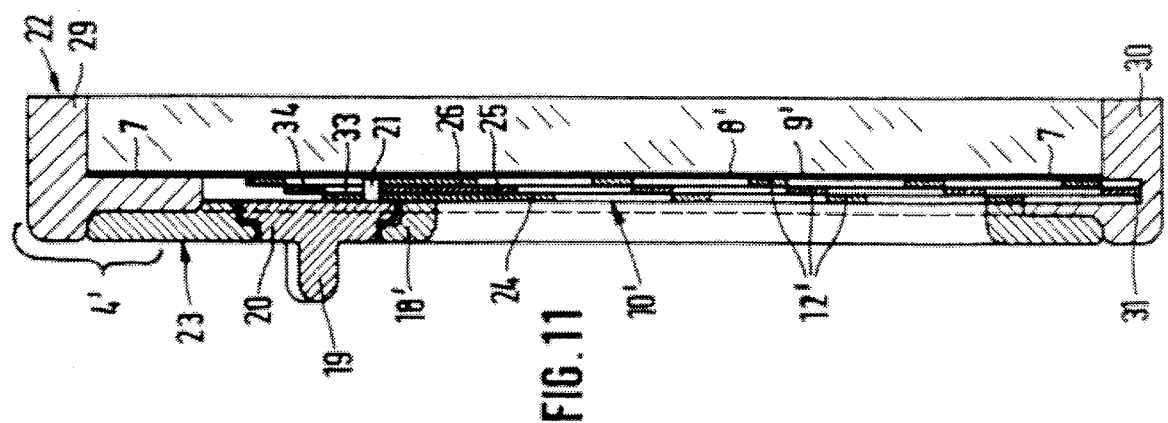
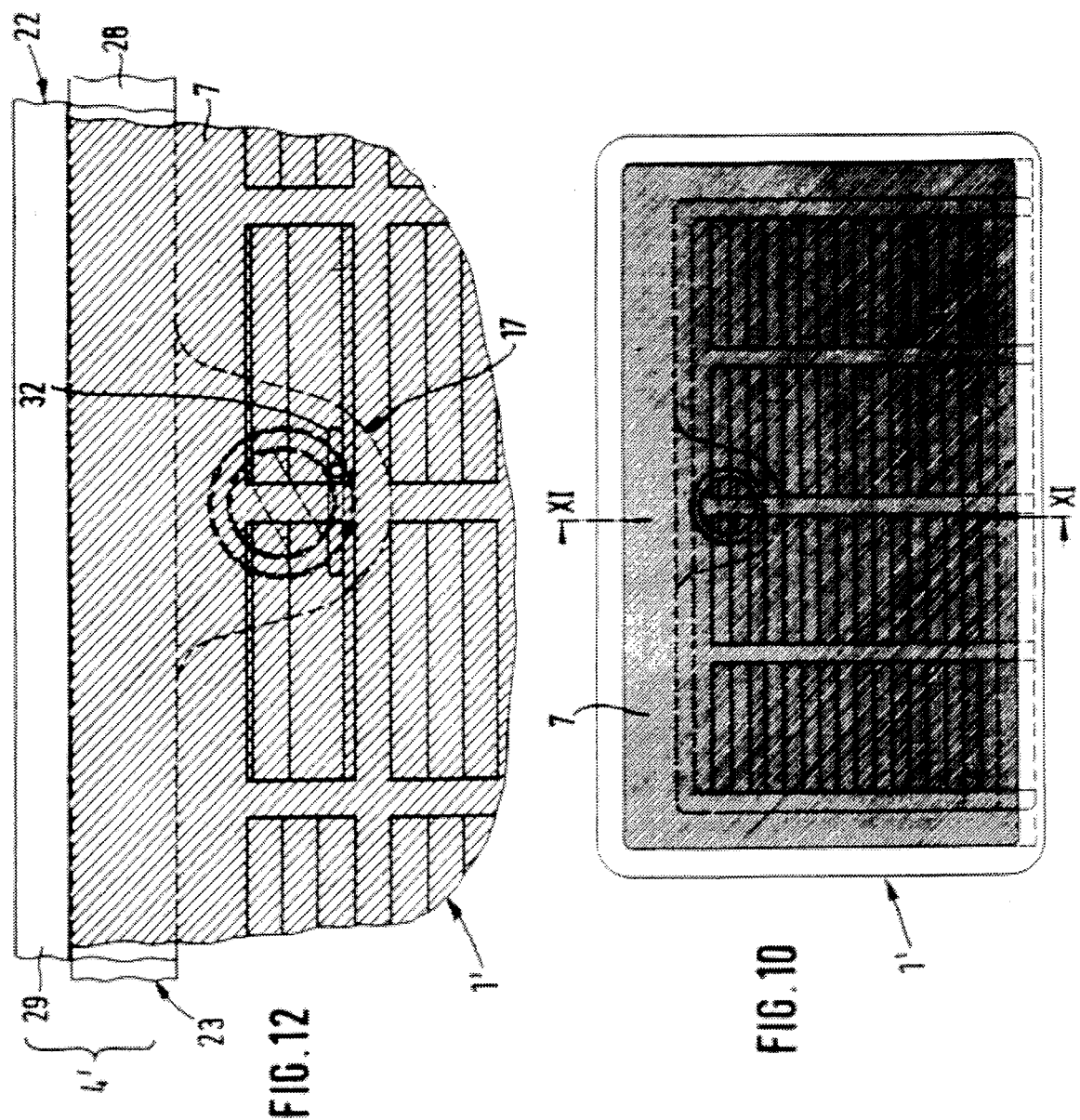

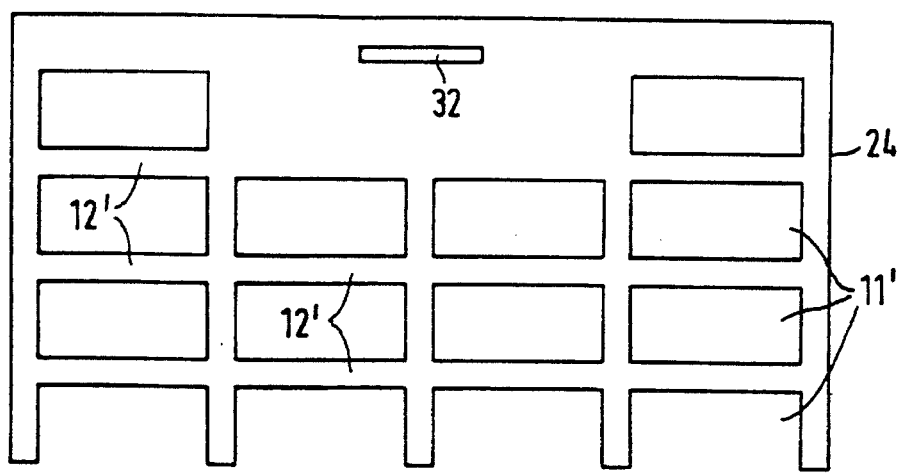
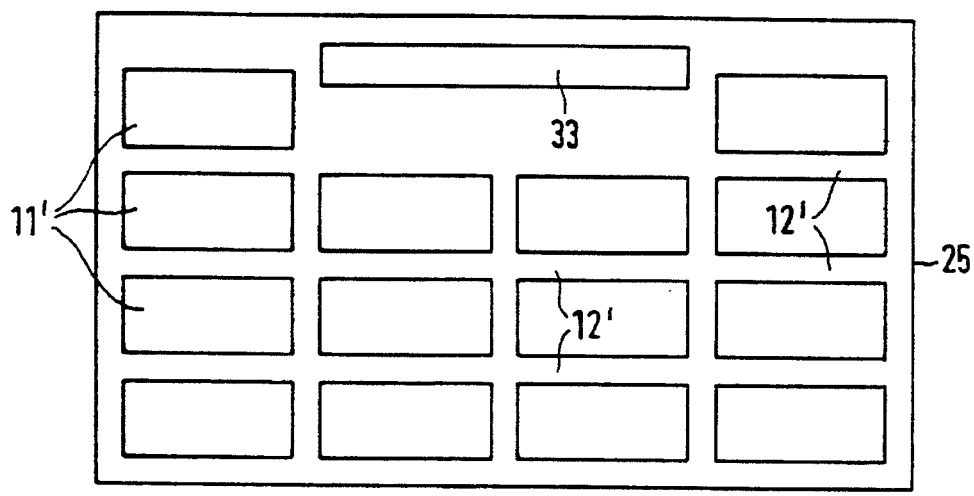
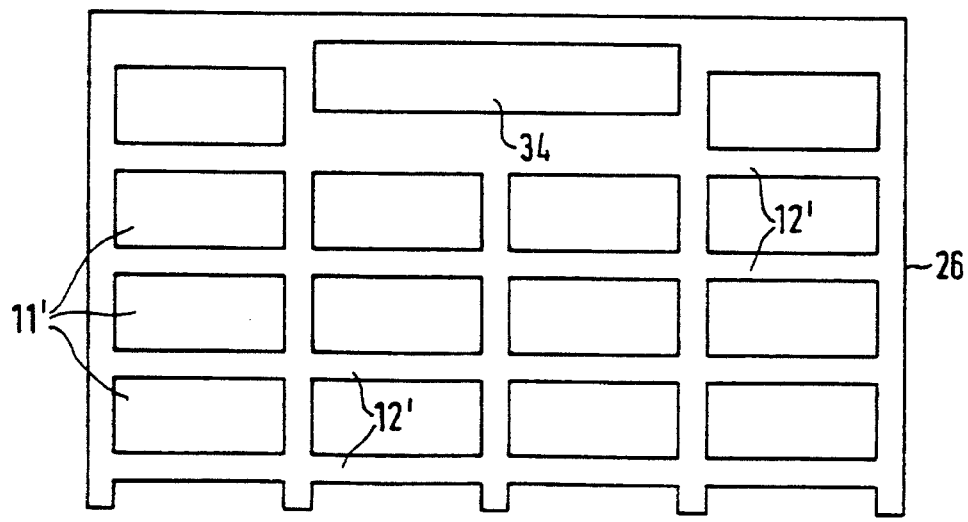

VEHICLE ROOF WITH GLASS LID AND SUNSHIELD

FIELD OF THE INVENTION

This invention relates to a vehicle roof with a glass lid and a sunshield.

BACKGROUND OF THE INVENTION

A vehicle roof is known which has a roof opening and a glass lid, which completely fills the roof opening in a closed position. The glass lid is adjustable for at least partly exposing the opening and has an inner face to which a sunshield is firmly attached. The sunshield possesses a series of uniformly spaced light apertures and associated with it is a thin closure plate constructed as a slider, which is guided parallel to the sunshield by means of mutually opposite guides and is provided with closure portions for completely or partly closing the spaced light apertures of the sunshield as desired. Openings alternate with the spaced light apertures, which openings can be completely or partly aligned as desired with the corresponding light apertures of the sunshield by sliding the closure plate. The sunshield is constructed as an opaque coating on the lower surface of the glass lid, against which the closure plate, which is slidably guided on the lid frame, directly bears.

By constructing the sunshield as a coating to the glass lid, against which the thin closure plate directly bears whilst being slidably guided on the lid frame and controlling the passage of light, a vehicle roof is obtained, the glass lid of which, while of simple construction, is of very low overall depth so that an advantageous increase in headroom inside the vehicle is obtained. The light apertures of the sunshield, arranged in rows at uniform spacings, are shaped as transverse slits of uniform dimensions and are bounded by opaque longitudinal and transverse webs of the glass lid coating, thus giving a lattice-like sunshield structure.

The thin closure plate is, with regard to its openings corresponding to the light apertures of the sunshield, its closure portions corresponding to the transverse webs, and its a real zones between the rows of openings corresponding to the longitudinal webs, of a lattice-like structure that registers with the sunshield. The width of the apertures and of the openings corresponds to the width of the transverse webs and the closure portions. The term "width" is to be understood for the purpose of this application as meaning dimensions in the sliding direction of the closure plate (this direction of sliding can be the same, but does not need to be the same, as the direction of sliding of the glass lid and the vehicle longitudinal axis).

On the basis of this construction, the light apertures of the sunshield are fully exposed or fully closed by the closure plate when the closure plate is displaced relative to the sunshield in the desired direction by a distance that corresponds to the equal width of the light apertures, openings, transverse webs and closure portions. On account of these equal width dimensions, the total maximum light passage area of the glass lid is restricted to about 50% of its total area that could be used for this purpose, or more exactly to less than 50% of its total area, because the longitudinal webs between the rows of light apertures also cannot be used for the passage of light. As a result, more than 50% of the usable area of the glass pane of the glass lid are covered by the opaque glass lid coating, and thus the maximum light incidence is limited.

An object of the present invention is further to improve the vehicle roof with glass lid and sunshield, while retaining a simple construction and the typical low total height, in such a way that the sunshield is given a maximum light passage area, which is larger than the opaque area covered by the glass lid coating in the useful area region of the glass lid.

SUMMARY OF THE INVENTION

According to the present invention there is provided a vehicle roof having a roof opening and a glass lid, which completely fills the roof opening in a closed position, the glass lid being adjustable for at least partly exposing the opening, having a lower face and being provided with a sunshield constructed as an opaque coating of the lower face of the glass lid, which sunshield possesses a series of uniformly spaced light apertures and with which is associated a closure plate constructed as a slider and bearing directly against it, there being a lid frame parallel to the sunshield on which said closure plate is slidably guided and said closure plate being equipped with closure portions for optionally completely or partly closing or opening the light apertures of the sunshield and openings alternating therewith, which openings can be completely or partly aligned with the corresponding light apertures of the sunshield by displacing the closure plate; wherein the width of the light apertures of the sunshield and the width, equal thereto, of the openings of the closure plate is equal to a multiple of the width of the closure portions of the closure plate or of the distance, equal thereto, between the light apertures of the sunshield, and wherein the closure plate consists of a number, corresponding to the aforementioned multiple, of individual, thin closure plate layers, which bear against one another without intermediate spaces and are displaceable relative to one another.

With the present construction, the light apertures of the sunshield are several times wider than the transverse webs situated between them, which are the same as the closure portions of the closure plate. In order that these widened light apertures, nevertheless, can be completely covered by the closure plate, the closure plate is composed of a plurality of thin layers, lying close to one another, which can be displaced stepwise, the sum of the widths of the closure portions of the individual layers corresponding to the width of the light apertures. The aforementioned plurality of the width corresponds in numbers to the number of the closure plate layers. With the preferred number of three closure plate layers, consequently, the light apertures of the sunshield and the openings of the closure plate layers agreeing therewith are three times as wide as the opaque transverse webs between the light apertures of the sunshield and the closure plate portions of the closure plate layers agreeing therewith. If the light apertures of the sunshield are in complete alignment with the openings of the closure plate layers, a maximum area for light incidence or light passage is made available at the glass lid, which area is substantially larger than the opaque area covered by the lattice structure of the sunshield and of the multilayer closure plate.

The lid frame advantageously is constructed of two parts, with an upper frame part enclosing and holding the glass pane and a lower frame part which can be firmly connected therewith. The arrangement here is such that the distance between the lower frame part and the lower surface of the glass pane or sunshield is approximately equal to the packing thickness of the multilayer closure plate.

For a step-by-step sliding of the individual closure plate layers, the closure plate layers can be slidable one after another in such a way that initially one of two outer closure plate layers is slidable, after a sliding distance of approximately the width of the closure portions the adjacent closure plate layer is entrained, and any further closure plate layers are each entrained in their layer sequence by corresponding displacement distances, until for the last displacement distance of approximately the width of the closure portions, the other of the two outer closure plate layers is also entrained. This arrangement ensures that the individual layers are displaced in succession, the sliding distance of each corresponding approximately to the width of the closure portions or the width of the transverse webs of the sunshield corresponding therewith.

For the step-by-step sliding of the closure plate layers, a drive can be mounted on a forward transverse component of the lower lid frame part for the displacement of the closure plate layers in the longitudinal direction of the vehicle, said drive apparatus consisting of a circular drive disc, mounted rotatably but axially fixed in a housing and provided with a downwardly pointing handle, which circular drive disc possesses, on an upper face thereof, an eccentrically mounted, upwardly projecting entrainer pin, which slidably engages into slits formed transversely to the vehicle longitudinal direction in each of the closure plate layers, the width of which slits varies, in the individual closure plate layers, according to the entrainer pin engagement that occurs successively from one closure plate layer to the next, and increases by steps from one of the two outer closure plate layers to the other. By rotation of a handle, the closure plate layers are displaced one after another by the distance stated. The displacement of the individual closure plate layers can be indexed at the drive apparatus, and also on the individual layers, by suitable means. The special feature of the displacement drive consists in that the closure plate layer first moved is displaced through the whole distance corresponding to the width of the light apertures, while the succeedingly displaced layers travel each only a portion of this distance, with a decreasing trend, because their sliding entrainment takes place only gradually. With the preferred three closure plate layers, the first displaced layer travels the full distance, the middle layer two thirds of the distance and the last moved layer only one third of the distance.

The maximum amount of opening and the closure position of the sunshield are limited by stops.

BRIEF SUMMARY OF THE DRAWINGS

For a better understanding of the invention, and to show how the same may be carried into effect, reference will now be made by way of example, to the accompanying drawings, in which:

FIG. 1 is a plan view of a glass lid of a vehicle roof, with fully opened light apertures, of large area dimensions, of the sunshield, FIG. 2 is a longitudinal section through the glass lid taken on line II—II in FIG. 1, FIG. 3 is an enlarged portion of the plan view of FIG. 1, in the region of the glass lid possessing drive apparatus, FIG. 4 is a plan view corresponding to FIG. 1, but with light apertures closed by one third, FIG. 5 is a longitudinal section through the glass lid on line V—V in FIG. 4, FIG. 6 is an enlarged partial plan view corresponding to FIG. 4 in the region of the glass lid possessing the drive apparatus, FIG. 7 is a plan view corresponding to FIGS. 1 and 4, but with light apertures closed by two thirds, FIG. 8 is a longitudinal section through the glass lid corresponding to line VIII—VIII in FIG. 7, FIG. 9 is an enlarged partial view from FIG. 7 on the region of the glass lid possessing the drive apparatus, FIG. 10 is a plan view corresponding to FIGS. 1, 4 and 7, but with light apertures fully closed, FIG. 11 is a longitudinal section through the glass lid corresponding to line XI—XI in FIG. 10, FIG. 12 is an enlarged partial view from FIG. 10 on the region of the glass lid possessing the drive apparatus, FIG. 13 is a partial cross-section through the glass lid corresponding to line XIII—XIII in FIG. 1, and FIGS. 14–16 are plan views on the individual layers of the three-layer closure plate.

DESCRIPTION OF PREFERRED EMBODIMENT

In the drawings, the Figure groups 1 to 3, 4 to 6, 7 to 9 and 10 to 12 illustrate the individual step phases between the fully opened and the fully closed positions of the sunshield of the glass lid. The drawings are schematically depicted, to the extent that, in all the longitudinal and transverse sectional views, the thickness dimensions of the elements shown in section are shown considerably enlarged compared to the plan dimensions of these elements, for improved clarity. Furthermore, only four rows of light apertures and openings respectively are shown, which each consist of four and three light apertures or openings respectively. The number of rows and of light apertures and openings situated therein can, of course, be either larger or smaller.

In the drawing, only the glass lid 1' is shown, and not the usual surrounding constructions of a sliding roof, sliding-lifting roof, spoiler roof or ventilation flap roof. The glass lid 1' is composed of a glass pane 2 (the term panes in this connection being understood to include any transparent material) and a lid frame 4', surrounding the glass pane 2' in the edge region and extending around the lid. The lid frame 4' can, as a difference from the construction shown, consist of an upper covering frame which covers over the edge of the glass pane and of a counter-frame, screwed to the upper covering frame. In the preferred form of construction, however, the lid frame 4' consists of an upper frame part 22, which is formed by injection moulding or foaming around the glass pane 2 with plastics material, for example with polyurethane, and of a lower frame part 23, which engages flush into the upper frame part 22 and can be screwed to it. At the outer periphery of the upper frame part 22, an edge gap seal can be fitted in the usual manner. Those connecting elements by which the glass lid 1' is attached to actuating elements of the roof construction for guiding and setting it, are not shown in order to simplify the drawing.

The glass pane 2 is provided, in the usual manner, with an opaque decorative frame 7 extending right up to its edge, to prevent viewing from above. This decorative frame 7 is applied by the screen printing process onto the lower surface of the glass pane 2 before the upper frame part 4 is fitted. In the screen printing operation there is simultaneously and also printed, onto the lower face of the glass pane 2 within the area bounded by the decorative frame 7, a lattice forming the sunshield 8', this lattice also consisting of opaque, i.e. non-transparent, interconnected areas. As a result of this lattice-like print, the sunshield 8' is produced, comprising a plurality of rows of light apertures 9', spaced apart uniformly in the longitudinal direction of the vehicle, which are provided in the form of transverse slits of uniform dimensions. The light apertures 9' are bounded by longitudinal and transverse webs of the printed-on lattice of the sunshield 8'. In this way, opaque and transparent areal zones of the glass pane 2 alternate. The multilayer closure plate 10' bears directly from below against the sunshield 8' and glass pane 2. The closure plate layers 24, 25 and 26, still to be described in more detail, are illustrated individually in FIGS. 14 to 16. The relative positions of each can best be seen from the longitudinal sectional views of FIGS. 2, 5 and 8 and 11. Like the sunshield 8', the closure plate 10', i.e. its closure plate layers 24, 25 and 26, are also provided with a plurality of rows of uniformly spaced openings 11', which correspond in their arrangement and spacings to the light apertures 9' in the sunshield 8'. Alternating with the openings 11', are closure plate portions 12' for the complete or partial coverage of the light apertures 9'. The closure plate portions 12' are formed by the transverse webs between the openings 11'. In this way, the lattice pattern of the sunshield 8' is repeated on the closure plate 10', i.e. on its closure plate layers 24, 25 and 26.

Instead of the slit-shaped light apertures 9' in the sunshield 8' and the corresponding openings 11' in the closure plate 10', as illustrated in the drawings, the light apertures and openings may also have a different geometrical position and form, provided always that it is ensured that, by sliding the individual layers of the closure plate 10' relative to the sunshield, a complete coverage of all light apertures in the sunshield and also a complete exposure of these light apertures is possible by corresponding web regions of the multilayer closure plate 10'.

An important feature for the dimensioning of the widths of the light apertures 9' and the openings 11' agreeing therewith, and also of the widths of the opaque webs of the sunshield 8' situated between the light apertures 9' and of the closure portions 12' coinciding with them, is that the width of the light apertures 9' and openings 11' shall be a multiple of the width of the aforementioned webs and closure portions 12', there being a sufficient number of closure portions 12' one above another, i.e. a sufficient number of closure plate layers must be provided one above another for the sum of the width dimensions of the closure portions 12' situated one above another to be equal to the width of the light apertures 9' and of the openings 11'. Otherwise, a complete coverage of the light apertures 9' in the sunshield 8' would not be possible.

The upper frame part 22 of the lid frame 4' possesses, at its front transverse portion 29, its rear transverse portion 30 and its two lateral portions 35, substantially the same cross-section. The lower frame part 23 fits accurately into the upper frame part 22. The dimensions and profilings of the two frame parts are so chosen that a plane bearing surface 27 for the multilayer closure plate 10' is formed on the lower frame part 23. The plane bearing surface 27 runs parallel and at a distance from the lower face of the glass pane 2 and sunshield 8', this distance corresponding approximately to the total thickness of the multilayer closure plate 10'. As FIG. 13 illustrates, the individual closure plate layers 24, 25 and 26 of the closure plate 10' are slidably guided on the inner surface 36, facing towards them, of the upper frame part 22. For seating the rear ends of the closure plate layers 24, 25 and 26, a seating groove 31 is situated in the rear transverse part 30 of the upper frame part 22. The vertical wall face of the seating groove 31 forms a slide stop for the closure plate layers. At the front, a vertical surface of the glass pane seating flange of the front transverse part 29 of the upper frame part 22 serves as a forward limit to the sliding travel of the closure plate layers.

The closure plate layers 24, 25 and 26 consist of thin metal sheets or plastics sheets and, in respect of the direction of sliding, are of equal width but different lengths. That closure plate layer which travels the longest sliding distance, in the example shown the lower closure plate layer 24, has the shortest length, whereas the closure plate layer having the shortest travel distance, in the example shown the upper closure plate layer 26, has the longest length. In the front, middle region of the three closure plate layers 24, 25 and 26, there are slits 32, 33 and 34 of different lengths and widths. These slits serve for the sliding drive of the closure plate layers active at different times. Since the closure plate layers are of thin metal sheet or plastics sheet, they can bear closely against the lower face of the sunshield 8', even when the glass lid 1' is curved in its transverse direction to adapt to the roof curvature. In this case, of course, the bearing surface 27 on the lower frame part 23 is not flat, but has a corresponding curvature.

As can be seen most clearly from FIGS. 14 to 16, in the example shown, on all the closure plate layers 24, 25 and 26 the foremost transverse rows of the openings 11' commence with a spacing dimension of twice the closure portions 12' from the relevant front edges of the closure plate layers. The spacing of the slits 32, 33 and 34 from the front edges of the closure plate layers is, in all three layers, equal to the width dimension of the closure portions 12'.

In detail, the apertures provided in the closure plate layers 24, 25 and 26 are as follows. In the case of the lower closure plate layer 24, the width of the slit 32 is approximately equal to the diameter of an entrainer pin 21 of the drive apparatus 17, yet to be described. At the rear transverse row of openings 11', these openings are open to the rear. The closure plate layer 24 therefore terminates at the back with projecting longitudinal webs, the length of which corresponds to three times the width of the closure plate portions 12'. This closure plate layer 24 therefore has the shortest length dimension in the direction of sliding.

In the case of the middle closure plate layer 25, the width of the slit 33 for engagement of the entrainer pin 21 is approximately equal to the diameter of the entrainer pin plus the width of a closure portion 12'. The rear side of this closure plate layer 25 is formed by a continuous transverse web, adjacent to the last transverse row of openings 11. Accordingly, the length dimension of the closure plate layer 25 in the direction of sliding is longer than that of the lower closure plate layer 24 by the width of one closure portion 12'.

In the upper closure plate layer 26, the width of the slit 34 for engagement of the entrainer pin 21 corresponds approximately to the diameter of the entrainer pin plus twice the dimension of the width of a closure portion 12'. At the rear, the closure plate layer 26 terminates with projecting, longitudinal webs, the length of which is equal to the width of one closure portion 12'. The upper closure plate layer 26 is thus longer than the middle closure plate layer 25 by one width, and longer than the lower layer 24 by two widths, of the closure portion 12'. The closure plate layers 24, 25 and 26 can be displaced one after another in the longitudinal direction of the vehicle, each through the distance that is present between their front edge, or rear edge respectively, and the adjacent stop. The displacement movement can be produced by hand-holds provided on the individual closure plate layers, by direct hand action. In the preferred example of embodiment, however, the drive apparatus 17 is provided for this purpose, which can be seen in different positions from many of the figures. The drive apparatus is mounted on the forward, transverse component 28 of the lower frame part 23. It comprises a rotatably journalled, flat circular drive disc 20, mounted axially immovable in a casing 18' and possessing a handle 19 pointing downwards. This disc carries, on its upper face, an eccentrically mounted, upwardly projecting entrainer pin 21, which engages into all the slits 32, 33 and 34 of the closure plate layers 24, 25 and 26. The also comparatively flat casing 18' is, in this example, integrally formed on the forward transverse member 28. When the drive disc 20 is rotated by means of the handle 19, the entrainer pin 21 moves in the manner of a crank pin on a circular path about the central axis of the drive disc.

When the drive disc 20 is rotated in the closure direction, the entrainer pin 21, because of its engagement into the slit 32, displaces the lower closure plate layer 24 backwards, starting from the position shown in FIGS. 1 to 3, until the position shown in FIGS. 4 to 6 is reached. In this position, the entrainer pin strikes against the rear edge of the slit 33, so that, as rotation continues, the middle closure plate layer 25 additionally to the lower closure plate 24 is displaced towards the rear, until the position shown in FIGS. 7 to 9 is reached. In this position, the entrainer pin 21 also strikes against the rear edge of the slit 34, so that, as rotation continues, not only the closure plate layers 24 and 25 but also the upper closure plate layer 26 is entrained towards the rear. The rotation of the drive disc 20 in the closure direction can be continued until the position shown in FIGS. 10 to 12 is reached. Here, the rear edges of all the closure plate layers 24, 25 and 26 abut against the vertical wall face of the seating groove 31, thus causing the closure operation of the sunshield to end. The opening of the sunshield takes place in the reverse direction of rotation of the driving disc 20, the closure plate layers being moved forwards by the entrainer pin in analogous manner to the closure operation. Once again, first the lower closure plate layer 24 is displaced and then the closure plate layers situated above it are each entrained, as soon as the entrainer pin 21 bears against the front edges of the slits 33 and 34 of the closure plate layers 25 and 26. After the opening operation has been completed, the front edges of the closure plate layers 24, 25 and 26 are situated against their forward, vertical abutment surface of the front transverse component 29 of the upper frame part 22. The closure plate portions 12' of the closure plate layers are also situated in alignment above one another, so that the light apertures 9' of the sunshield 8' are fully exposed. Because of the relatively large area of the light apertures 9', only slightly weakened light now penetrates through the lattice structure of the sunshield 8' into the vehicle interior.

The provision of a multilayer closure plate 10' offers not only the possibility of an important increase in the light passage areas, but also allows an intentional coverage or exposure of the light apertures 9'. If the individual closure plate layers are displaced step-by-step by one width each time of a closure portion 12' and the displacement operation is terminated in the position reached each time, then successively individual closure portions will be situated underneath the light apertures and cover these or expose them in proportion to the distance travelled by the displaced closure plate layers. Any intermediate positions are, of course, also possible, so that an infinitely variable closure or opening of the light apertures 9' is achieved.

I claim:

1. A vehicle roof having a roof opening and a sunroof assembly, said sunroof assembly including a glass lid having a lower face and being provided with a sunshield constructed as an opaque coating of the lower face of the glass lid, the sunshield possessing a series of uniformly spaced light passages each having a predefined width, the sunroof assembly further including a closure plate constructed as a slider and bearing directly against the glass lid, the sunroof assembly further including a lid frame parallel to the sunshield on which the closure plate is slidably guided, the closure plate being equipped with closure bands for selectively completely closing, for partly closing and for opening the light passages of the sunshield, the closure plate further including openings alternating with the closure bands, where the openings can be completely or partly aligned with the light passages of the sunshield by displacing the closure plate; wherein the closure plate comprises at least two closure plate layers, each said closure plate layer bearing against each other and being displaceable relative to each other, each said closure plate layer having a plurality of alternating apertures and closure portions, each closure plate layer's apertures being of a width substantially similar to the width of said sunshield light passages and each closure plate layer's closure portions being of a width at least equal to said sunshield light passage width divided by the number of closure plate layers, wherein, in the closure or opening of the light passages of the sunshield, a first of said closure plate layers slides by entrainment means a distance of approximately the width of the closure portions of an adjacent closure plate layer and the adjacent closure plate layer is thereafter entrained, and subsequent closure plate layers are each entrained in sequential fashion after each of said closure plate layers slides a distance of approximately the width of the closure portion of the adjacent closure plate layer until for the last displacement distance of approximately the width of the closure portions, the last of said closure plate layers is also entrained.

2. A vehicle roof having a roof opening and a sunroof assembly, said sunroof assembly including a glass lid having a lower face and being provided with a sunshield constructed as an opaque coating of the lower face of the glass lid, the sunshiled possessing a series of uniformly spaced laterally aligned light passages each having a predefined longitudinal width, the sunroof assembly further including a closure plate constructed as a slider and bearing directly against the glass lid, the sunroof assembly further including a lid frame parallel to the sunshield on which the closure plate is slidably guided, the closure plate being equipped with laterally aligned closure bands for selectively completely closing, for partly closing and for opening the light passages of the sunshield, the closure plate further including laterally aligned openings alternating with the closure bands, where the openings can be completely or partly aligned with the light passages of the sunshield by displacing the closure plate; wherein the closure plate comprises at least two closure plate layers, each said closure plate layer bearing against each other and being displaceable relative each other, each said closure plate layer having a plurality of laterally aligned alternating apertures and closure portions, each closure plate layer's apertures being of a longitudinal width substantially similar to the longitudinal width of said sunshield light passages and each closure plate layer's closure portions being of a longitudinal width at least equal to said sunshield light passage longitudinal width divided by the number of closure plate layers, wherein a drive apparatus is mounted on a forward transverse component of the lid frame for the displacement of the closure plate layers in the longitudinal direction of the vehicle, said drive apparatus comprising a circular drive disc, said drive disc mounted rotatably and axially fixed in a housing, said drive disc provided with a downward pointing handle and an eccentrically mounted upwardly projecting entrainer pin, said entrainer pin slidably engages slits of different width in each of the closure plate layers, wherein said passages are selectively and variably occluded by said closure portions of said closure plate layers by said entrainer pin successively engaging said slits of said closure plate layers one at a time to successively slide said closure portions across said passages.

3. A vehicle sunroof adapted to provide varying levels of light blocking, said sunroof including a translucent panel suitable for transmitting light and further including an opaque sunshield suitable for blocking light transmission, said sunshield having a plurality of slits formed therein for selectively allowing transmission of light through said sunshield, said sunshield thereby having alternating opaque sunshield bands and transmissive sunshield slits, said sunroof further including at least two closure plates mounted longitudinally slidable relative to said translucent panel and said sunshield, each said closure plate being opaque and having a plurality of slits formed therein for selectively allowing transmission of light through said plates, said closure plates slits being of a longitudinal width at least as wide as the longitudinal width of said transmissive sunshield slits, said closure plates thereby having alternating opaque closure plate bands and transmissive closure plate slits, said opaque closure plate bands having a longitudinal width at least as wide as the longitudinal width of said transmissive sunshield slits divided by the number of closure plates, wherein "N" represents the number of closure plates, said sunroof having a maximum level of light transmission therethrough when said transmissive closure plate slits are fully aligned adjacent to said transmissive sunshield slits and having a minimum level of light transmission therethrough when said opaque closure plate bands are sequentially aligned by entrainment means adjacent to said transmissive sunshield slits, and wherein sliding of a first one of said slidable closure plates longitudinally by said entrainment means results in a maximum blocking of 1/Nth of the light transmission and wherein further light blocking occurs as successive ones of said slidable closing plates are slid longitudinally by said entrainment means to block successive 1/Nth portions of the light transmission until all light transmission is blocked.

* * * * *